UNITED STATES PATENT OFFICE.

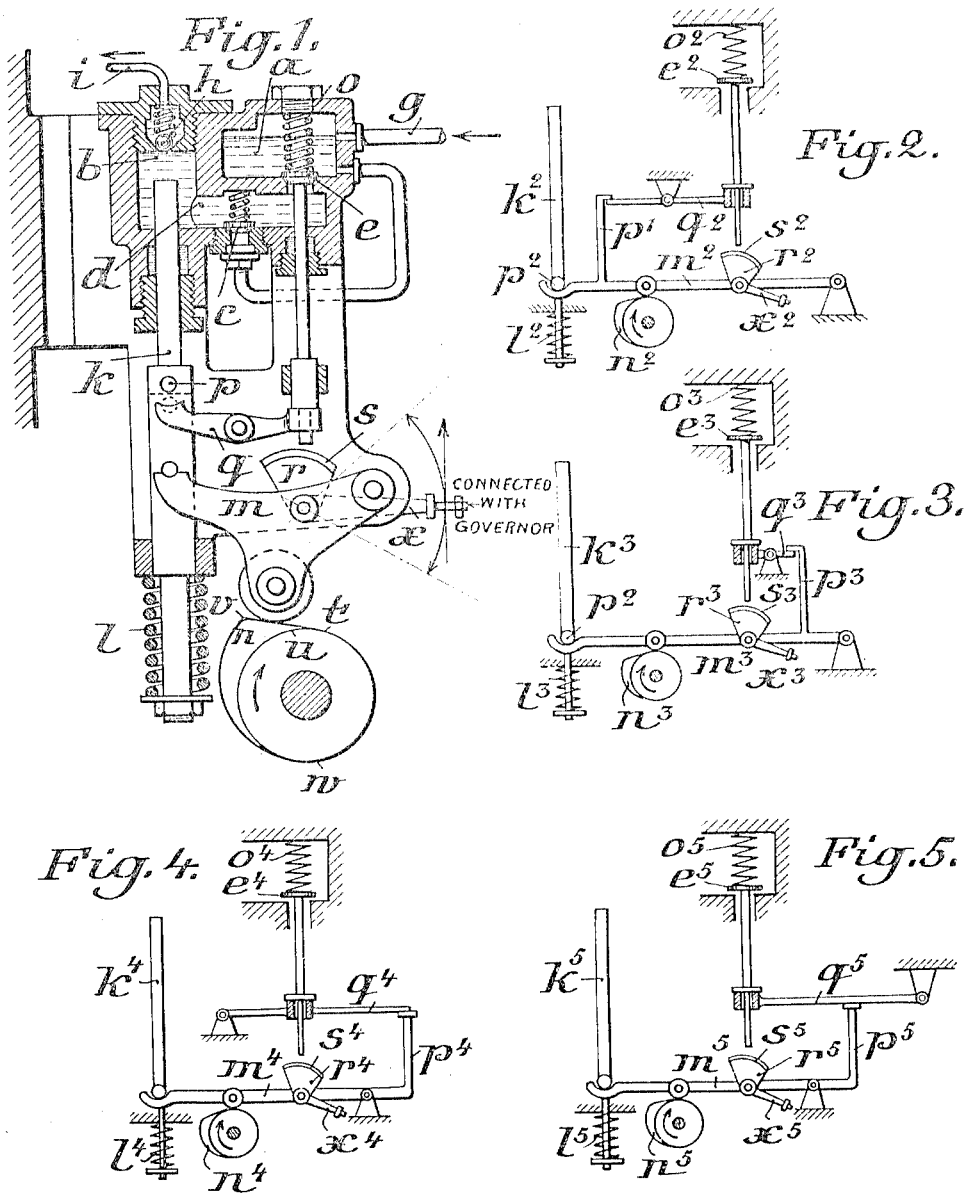

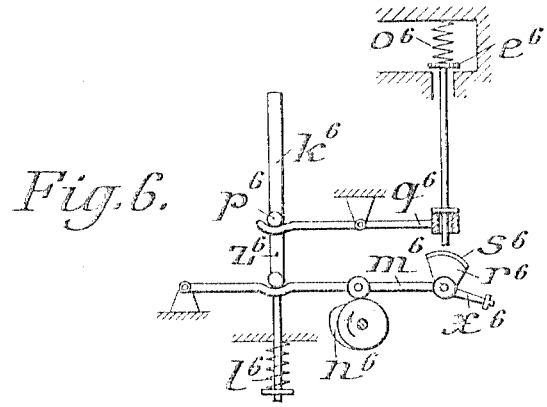
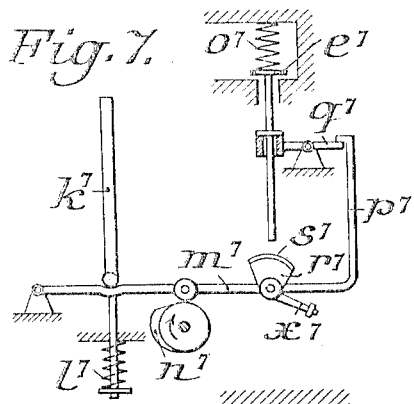
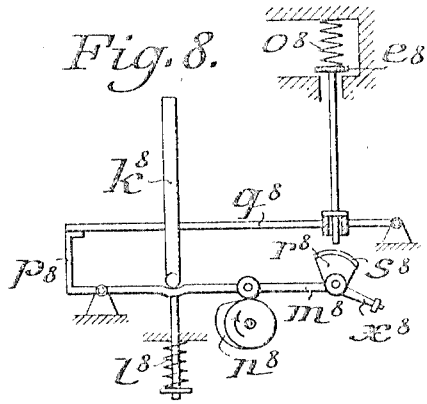
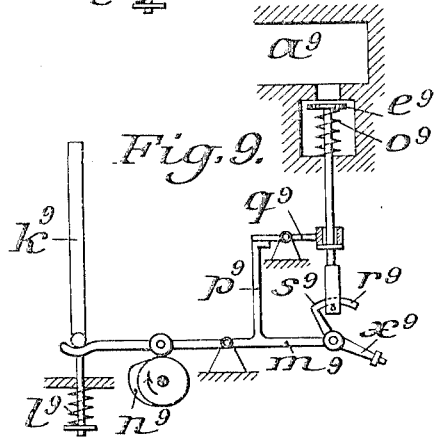
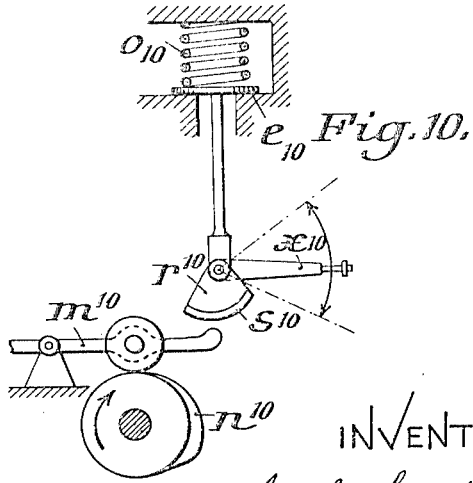

JACOB GUNTHER, OF BERGISCH GLADBACH, NEAR COLOGNE, GERMANY.

FUEL-PUMP FOR COMBUSTION-ENGINES OF THE INJECTION TYPE.

1,040,666.　　　　　Specification of Letters Patent.　　　Patented Oct. 8, 1912.

Application filed January 21, 1911. Serial No. 603,845.

*To all whom it may concern:*

Be it known that I, JACOB GUNTHER, engineer, a subject of the German Emperor, residing at 109 Laurentiusstrasse, Bergisch Gladbach, near Cologne-on-the-Rhine, Germany, have invented certain new and useful Improvements in Fuel-Pumps for Combustion-Engines of the Injection Type, and do hereby declare the following to be a full, clear, and exact description of the invention, such as will enable others skilled in the art to which it appertains to make and use the same.

My invention relates to improvements in fuel pumps for combustion engines of the injection type. In combustion engines of this class the fuel instead of being vaporized within a chamber disposed before the cylinder is directly supplied to the atomizing nozzle at the beginning of the combustion stroke. Therefore the fuel pump must supply a large amount of fuel at a considerable speed and within a comparatively short time.

During the first part of the stroke of the plunger the speed of the latter is necessarily very low, when using driving elements of the ordinary construction, such for example as cranks, eccentrics, cams, etc. Therefore means have heretofore been provided in fuel pumps of this class whereby the fuel discharge from the pump is prevented at the beginning of the stroke of the plunger, and when the latter has attained a greater speed, the fuel supply to the nozzle takes place. The driving mechanism is so constructed, that the plunger has the desired speed at the moment when the injection must take place. For effecting such a regulation of the fuel supply a back flow valve has been provided which is held in the open position at the beginning of the stroke of the plunger, and is closed when the plunger has attained the necessary speed, whereupon injection is effected. Afterward the said valve is reopened by means controlled by the governor of the engine according to the load of the engine.

My invention relates more particularly to the regulating means for the fuel supply. And the object of the improvements is to provide mechanism whereby the complicated regulation of the back flow valve, that is to say the opening of the valve, the closing of the same, and finally the reopening of the same in dependence of the governor, is effected in a simple way. For this purpose the said regulating movements are derived from the plunger or its driving mechanism. In both cases the valve is opened by means of an element which is movable with the plunger of the engine, the first opening of the valve which begins during the suction stroke of the plunger being derived from a part of the plunger or its driving mechanism which has a movement opposite to that of the part from which the second opening movement is derived, which begins during the pressure stroke. As the opening movements of the valve have the same direction in both cases, the movements of the said parts connected with the plunger and moving in opposite directions must be transmitted to the said valve in opposite senses.

For the purpose of explaining the invention more in detail several examples embodying the same have been shown in the accompanying drawings.

In said drawings Figure 1 is a vertical section of the pump and a side view of the driving and controlling mechanism, and Figs. 2 to 10 are diagrammatical views of modifications of the controlling valve and the driving and controlling mechanism.

Referring to the example illustrated in Fig. 1, the fuel chamber $a$ of the pump communicates with the cylinder $b$ of the pump through an automatic suction valve $c$ and a bore $d$, and furthermore through a back flow valve $e$ and the bore $d$. Fuel is supplied to the fuel chamber $a$ through a pipe $g$. The pressure valve is indicated by the letter $h$, and the fuel discharge tube from the pump to the nozzle of the working cylinder by the letter $i$. A spring $l$ has the tendency to force the plunger $k$ of the pump downward, and the said plunger is forced upward by means of a cam $n$ of the cam shaft or valve-operating shaft and a rocker $m$ engaging said cam. The cam $n$ is constructed with a smoothly ascending portion beginning at the point indicated by the letter $t$, and with a rapidly ascending portion beginning at the point indicated by the letter $u$. From the point $v$ which is farthest away from the axis of the shaft the cam gradually approaches the diameter indicated by the letter $w$ along a substantially circular line. A spring $o$ has the tendency to normally seat the back flow valve $e$, which is adapted to be opened from two different parts of the plunger or its driving mechanism. The first opening operation is performed during the suction stroke by means of a stud $p$ secured to the plunger $k$ and a rocking lever $q$ pivotally mounted on a suitable part of the frame of the pump and adapted to be engaged at one end by the stud $p$ and to engage with the opposite end the stem of the valve $e$. The second opening operation of the back flow valve which takes place during the pressure stroke of the plunger is effected by means of the surface $s$ of a block $r$ which is pivotally mounted on the rocker $m$. The surface $s$ is disposed eccentrically of the fulcrum of the block $r$ on the rocker $m$, and the block $r$ is operatively connected with the governor of the engine by means of a lever $x$ and other elements not shown in the figure. The connection between the governor and the abutment is such, that in case of an increase in the load and a decrease in the speed of the engine below the normal the lever $x$ is rocked upward and the block $r$ to the left, so that the surface $s$ engages the stem of the valve $e$ at a later moment, and the fuel supply from the pump is increased.

The operation of the pump is as follows: When the part $v$ of the cam $n$ which is farthest away from the axis of the cam shaft has passed beyond the rocker $m$, and rotation of the said shaft continues, the rocker $m$ is gradually lowered by riding on the descending portion of the cam, and consequently the spring $l$ is at liberty to force the plunger $k$ downward so that the latter performs its suction stroke. By such downward movement fuel is drawn into the cylinder $b$ through the suction valve $c$. Before the end of the suction stroke is attained, the stud $p$ strikes against the rocking lever $q$ and thereby throws the opposite end of the latter upward, so as to open the back flow valve $e$ against the action of the spring $o$. In the meantime the abutment $r$ is moving downward and away from the stem of the valve $e$. While the rocker $m$ is riding on the surface $w$ the plunger $k$ is at rest, and the valve $e$ remains open, so that the cylinder $b$ is completely filled when the pressure stroke begins. When the point $t$ of the cam arrives below the rocker $m$ the plunger $k$ begins to slowly move upward while the valve $e$ is still unseated, because the stud $p$ remains in contact with the lever $q$. Therefore at the beginning of the pressure stroke, and while the cam $n$ is moving from the point $t$ to the point $u$, no fuel is supplied by the pump. When the point $u$ arrives below the rocker $m$ and the portion of the cam indicated by the letters $u$—$v$ comes into operation, the stud $p$ has risen sufficiently to release the rocking lever $q$. Therefore the valve $e$ is closed by its spring $o$, and the fuel is discharged through the tube $i$ and to the fuel nozzle of the working cylinder. The speed with which the fuel is thus discharged is comparatively great, because the plunger has assumed a high speed by the action of the rapidly rising portion $u$ to $v$ of the cam $n$. When a part of the cam surface which is near the point $v$ comes into engagement with the rocker $m$ the surface $s$ of the abutment $r$ has been raised so far, that it strikes against the stem of the valve $e$ so as to open the latter and stop the fuel supply to the nozzle. The moment at which the valve is thus unseated is controlled by the governor.

The position of the stud $p$ relatively to the rocking lever $q$ is such, that it is just disengaged from the latter when the rocker $m$ rides on the part $u$ of the cam $n$.

The mechanism for operating the back flow valve may be constructed in different ways, and several forms of this mechanism are illustrated in Figs. 2 to 10. For the sake of simplicity, the automatic suction valve and the automatic pressure valve have been omitted from these figures, it being understood however that these valves are to be used, so that three valves will be present in each of the structures. One modification of such mechanism is shown in Fig. 2 of the drawings. In the example shown a rocker $m^2$ is pivotally mounted at one end on a relatively fixed part of the frame of the pump. At its left hand end the rocker $m^2$ is adapted to be engaged by a stud $p^2$ secured to the plunger $k^2$, and at a point intermediate between the stud $p^2$ and its fulcrum the rocker is adapted to be engaged by a cam $n^2$ revolving with the valve-operating shaft. Furthermore the rocker carries a block $r^2$ which is adapted to be set by the governor according to the load of the engine. The rocker $m^2$ is further provided with an arm $p'$ which at its upper end is formed with a hook whereby it engages the free end of a rocking lever $q^2$.

The elements indicated in Fig. 2 by the letters $k^2$, $m^2$, etc. correspond to the elements which in Fig. 1 have received similar letters of reference. The operation of the various parts is similar to that described with reference to Fig. 1. While the plunger $k^2$ performs its downward stroke the valve $e^2$ is opened by the lever $q^2$ operated by the hook at the upper end of the arm $p'$, moved downward with the plunger $k^2$ under the influence of the stud $p^2$. During the first part of the pressure stroke the valve $e^2$ is held open by the stud $p^2$ which is moving upward with the plunger $k^2$. In the course of the upward movement of the plunger $k^2$ the hook on the arm $p'$ is withdrawn from the rocker $q^2$, so that the valve $e^2$ is forced on its seat by the action of its spring $o^2$, and fuel discharge to the fuel nozzle of the working cylinder begins at high speed. Near the end of the pressure stroke of the plunger the cam $n^2$ has raised the block $r^2$ sufficiently to again unseat the valve $e^2$, so that the fuel supply is again stopped. The block $r^2$ is set by the governor in the same way as has been described with reference to the block $r$ shown in Fig. 1.

In Fig. 3, I have shown a modification of the example illustrated in Fig. 2, the arm $p^3$ which corresponds to the arm $p'$ being disposed at the opposite side of the stem of the valve $e^3$. Accordingly the fulcrum of the rocking lever $q^3$ is likewise on the opposite side of the said stem. The operation of the mechanism is the same as that of the mechanism shown in Fig. 2, as will readily be understood from the figure.

In Fig. 4, I have shown a further modification of the invention. The construction of the mechanism corresponds to that shown in Figs. 2 and 3, with the exception, that the arm $p^4$ which corresponds to the arm $p'$ or $p^3$ is disposed at the opposite side of the fulcrum of the lever $m^4$ for which purpose the latter is provided with a rearward extension. The said arm engages the lever $q^4$ from below. The fulcrum of the lever $q^4$ may also be disposed at the right hand side of the stem of the valve $e^4$, as is indicated in Fig. 5. The operation of the mechanism shown in Figs. 4 and 5 is the same as that of the devices shown in Figs. 2 and 3, and it will be understood without further description.

In the modification shown in Fig. 6 the fulcrum of the rocker $m^6$ is disposed on the side of the plunger $k^6$ which is opposite to that of the stem of the valve $e^6$ and its operating parts, and the block $r^6$ is mounted on the free end of the said rocker. The stud $p^6$ is secured to the rod $z^6$ of the plunger $k^6$. The operation of the mechanism will readily be understood without further explanation.

The example shown in Fig. 7 is similar to that shown in Fig. 6. But instead of the stud $p^6$ an arm $p^7$ is provided on a rearward extension of the rocker $m^7$ and the rocking lever $q^7$ is accordingly mounted on the right hand side of the stem of the valve $e^7$. In the example shown in Figs. 6 and 7 the direction of the movement of the plungers $k^6$ and $k^7$ respectively is transmitted in the reversed direction to the stem of the valves $e^6$ and $e^7$ respectively by means of the levers $q^6$ and $q^7$.

Fig. 8 shows a similar example in which the lever $q^8$ and the arm $p^8$ are disposed in a different way, the arm $p^8$ being disposed on an extension of the rocker $m^8$ toward the left. In view of the fact, that in this construction the movement of the plunger is transmitted to the valve $e^8$ with a considerable reduction, the arrangement is particularly adapted for pumps in which the stroke of the valve $e^8$ is but small.

The example shown in Fig. 9 is different from those described above in this respect, that the back flow valve $e^9$ opens outward instead of inward. Therefore the head of the valve stem is not raised by the block $r^9$ but pulled downward. For this purpose the valve stem is slotted at its lower end and the block $r^9$ is constructed in the form of an arm which projects through the slot of the stem. In a similar way the movement of the valve stem by the arm $q^9$ is modified. The upward movement of the plunger during its pressure stroke is reversed by mounting the arm $r^9$ on the side of the fulcrum of the rocker $m^9$ which is opposite to the plunger $k^9$. The arm $p^9$ may be arranged in various ways, as will readily suggest itself to those skilled in the art from the examples described in Figs. 1 to 8. In the example shown in Fig. 9 the said arrangement is similar to that shown in Fig. 2.

In the example shown in Fig. 10 the block $r^{10}$ for opening the valve $e^{10}$ during the pressure stroke of the plunger of the pump is mounted on the valve stem. Otherwise the operating mechanism may be constructed in any preferred way.

Instead of providing a special back flow valve, the suction valve of the pump may be operated in such a way as to perform the function of the back flow valve. In this case the suction valve is moved in part automatically by its spring and in part positively by mechanism similar to that used in combination with the valve $e$ as described with reference to Fig. 1.

I claim herein as my invention:

1. In a fuel pump for internal combustion engines, the combination of the cylinder, its plunger, a fuel-supply, a valve controlling the connection of said fuel-supply with the pump cylinder, mechanical means operating in unison with the plunger for holding said valve open during the first part of the plunger's pressure stroke, mechanical means, also operating in unison with the plunger, for opening said valve near the end of said pressure stroke, and means for closing said valve during the intervening portion of the pressure stroke.

2. In a fuel pump for internal combustion engines, the combination of the cylinder, its plunger, a fuel-supply, a valve controlling the connection of said fuel-supply with the pump cylinder, a spring having a tendency to close said valve, mechanical means operating in unison with the plunger and in opposition to said spring, for holding the valve open during the first part of the plunger's pressure stroke, and mechanical means, also operating in unison with the plunger and in opposition to the spring, for opening said valve near the end of the pressure stroke, said spring operating to close the valve during the intervening portion of the pressure stroke.

3. In a fuel pump for internal combustion engines, the combination of the cylinder, its plunger, a fuel-supply, a valve-controlling the connection of said fuel-supply with the pump cylinder, mechanical means for holding said valve open during the first part of the plunger's pressure stroke, mechanical means for opening the valve near the end of the pressure stroke, governor-controlled means for varying the timing of the last-named mechanism, and means for closing said valve during the intervening portion of the pressure stroke.

4. In a fuel pump for internal combustion engines, the combination of the pump cylinder, its plunger, a fuel-supply, means for controlling the connection between the fuel-supply and the pump cylinder, mechanism operating on said means during the plunger's suction stroke and to keep it open during the first part of the pressure stroke, mechanism operating on said means near the end of the plunger's pressure stroke to again open communication between the cylinder and the fuel-supply, and a device for keeping said controlling means, during the intervening portion of the pressure stroke, in a position in which said means interrupts the connection between the fuel-supply and the pump cylinder.

5. In a fuel pump for internal combustion engines, the combination of the pump cylinder, its plunger, a fuel-supply, a valve controlling the connection between the fuel-supply and the pump cylinder, a lever operating to open said valve during the suction stroke and to keep it open during the first part of the pressure stroke, another lever operating to open said valve near the end of the plunger's pressure stroke, and means for closing said valve during the intervening portion of the pressure stroke.

6. In a fuel pump for internal combustion engines, a pump cylinder, its plunger, a fuel-supply, a valve controlling the connection of the pump cylinder with the fuel-supply, two studs connected with the plunger, mechanism adapted to be engaged by one of said studs and to hold said valve open from a time shortly before the end of the suction stroke to a time shortly after the beginning of the pressure stroke, mechanism, adapted to be engaged by the other stud, for opening the said valve at a later period of the pressure stroke, and means for closing said valve during the intervening portion of the pressure stroke.

7. In a fuel pump for internal combustion engines, a pump cylinder, its plunger, a fuel-supply, a valve controlling the connection of the pump cylinder with the fuel-supply, two studs connected with the plunger, mechanism adapted to be engaged by one of said studs and to hold said valve open from a time shortly before the end of the suction stroke to a time shortly after the beginning of the pressure stroke, mechanism, adapted to be engaged by the other stud, for opening the said valve at a later period of the pressure stroke, said last-named mechanism comprising a valve-operating member movable relatively to the other parts of said mechanism, and governor-controlled means for shifting said member to vary the time at which the valve is opened during the pressure stroke, and means for closing said valve during the intervening portion of the pressure stroke.

8. In a fuel pump for internal combustion engines, a pump cylinder, its plunger, a fuel-supply, a valve opening toward the fuel-supply and controlling its connection with the pump cylinder, two studs connected with the plunger, mechanism adapted to be engaged by one of said studs, and to hold said valve open from a time shortly before the end of the suction stroke to a time shortly after the beginning of the pressure stroke, an operating shaft, a lever arranged to be rocked by said shaft and to engage the other stud to operate the plunger, a valve-operating member secured to said lever at a point between its fulcrum and the operating shaft to open the valve at a later period of the pressure stroke, and means for closing said valve during the intervening portion of the pressure stroke.

In testimony, that I claim the foregoing as my invention, I have signed my name in presence of two subscribing witnesses.

JACOB GUNTHER.

Witnesses:
LOUIS VANDORY,
BESSIE F. DUNLAP.